United States Patent [19]

Bleiweiss et al.

[11] 4,403,565
[45] Sep. 13, 1983

[54] EMERGENCY TRIANGULAR ROAD SAFETY DEVICE

[75] Inventors: Arthur F. Bleiweiss, Toronto; Terence E. Base, London, both of Canada

[73] Assignee: Dominion Auto Accessories Limited, Toronto, Canada

[21] Appl. No.: 242,625

[22] Filed: Mar. 11, 1981

[51] Int. Cl.³ .............................................. E01F 9/10
[52] U.S. Cl. .................................... 116/63 T; 40/602; 116/63 P; 250/463.1; 350/97
[58] Field of Search ................ 116/63 P, 63 T, 63 C, 116/209; 40/602, 903, 600

[56] References Cited

U.S. PATENT DOCUMENTS

| | | | |
|---|---|---|---|
| 1,150,444 | 8/1915 | Martter | 40/606 |
| 3,625,177 | 12/1971 | Miller | 116/63 P |
| 3,738,309 | 6/1973 | Nicholl | 116/63 P |
| 3,759,214 | 9/1973 | Evans et al. | 40/903 X |
| 3,766,881 | 10/1973 | Ward | 116/63 P |
| 3,768,187 | 10/1973 | Dunne | 40/602 |
| 3,777,428 | 12/1973 | Caufield | 40/602 X |
| 3,828,455 | 8/1974 | Bentley | 40/602 |
| 4,248,001 | 3/1981 | Feuvray | 40/602 |

Primary Examiner—Daniel M. Yasich
Attorney, Agent, or Firm—Barnes, Kisselle, Raisch, Choate, Whittemore & Hulbert

[57] ABSTRACT

An emergency warning device comprising a base, three arms extending upwardly from the base to define an equilateral triangle, one of the arms extending horizontally on the base and the other two arms extending upwardly. Each arm has reflective and fluorescent means on opposed surfaces thereof. Vane devices are constructed and arranged, shaped and positioned on the equilateral triangle and such that air flow against a face of the triangle produces a downward force tending to prevent movement of the device relative to a road surface.

27 Claims, 21 Drawing Figures

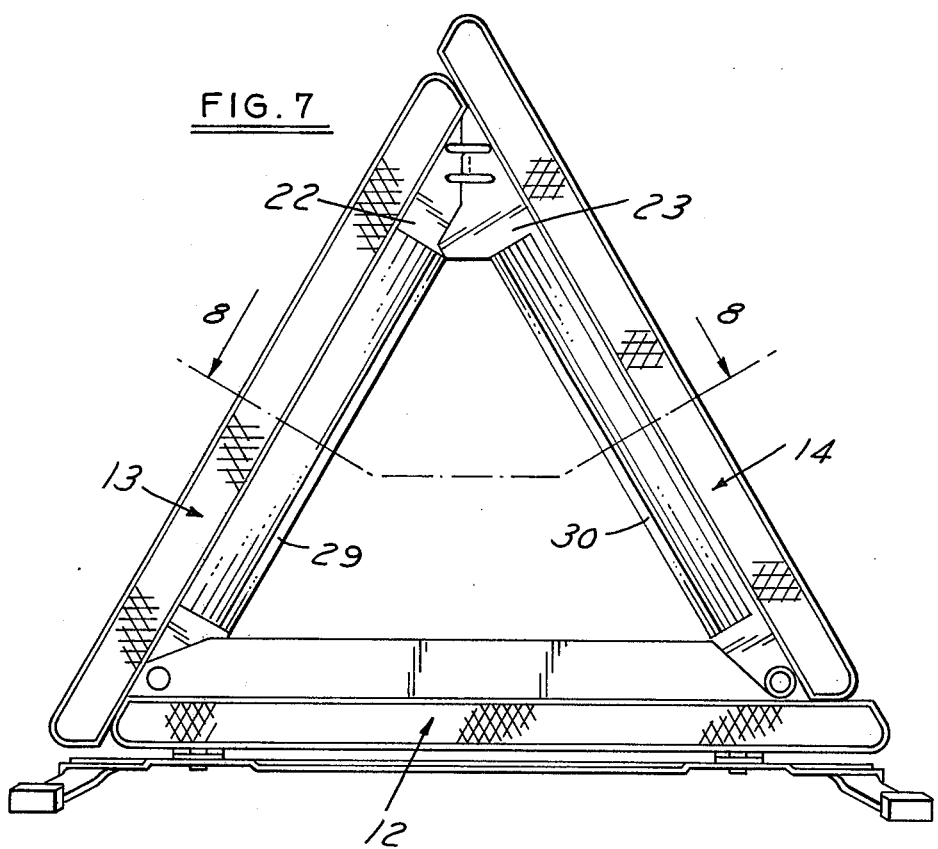
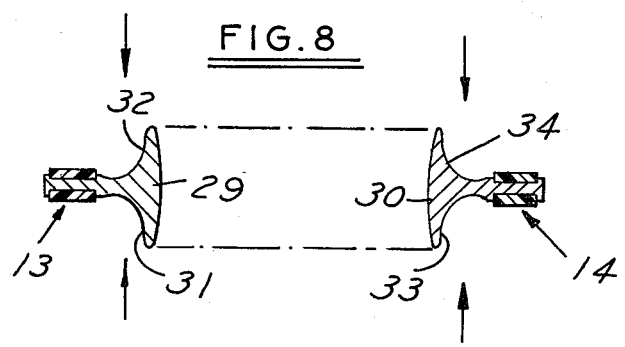

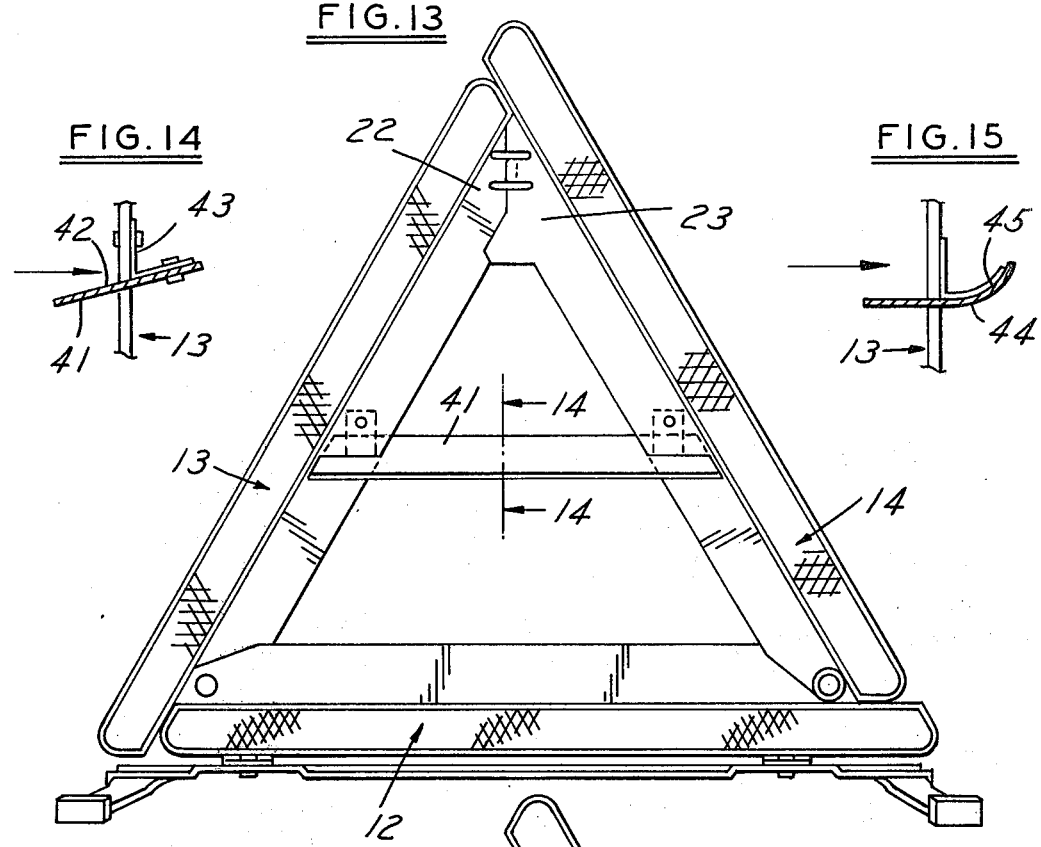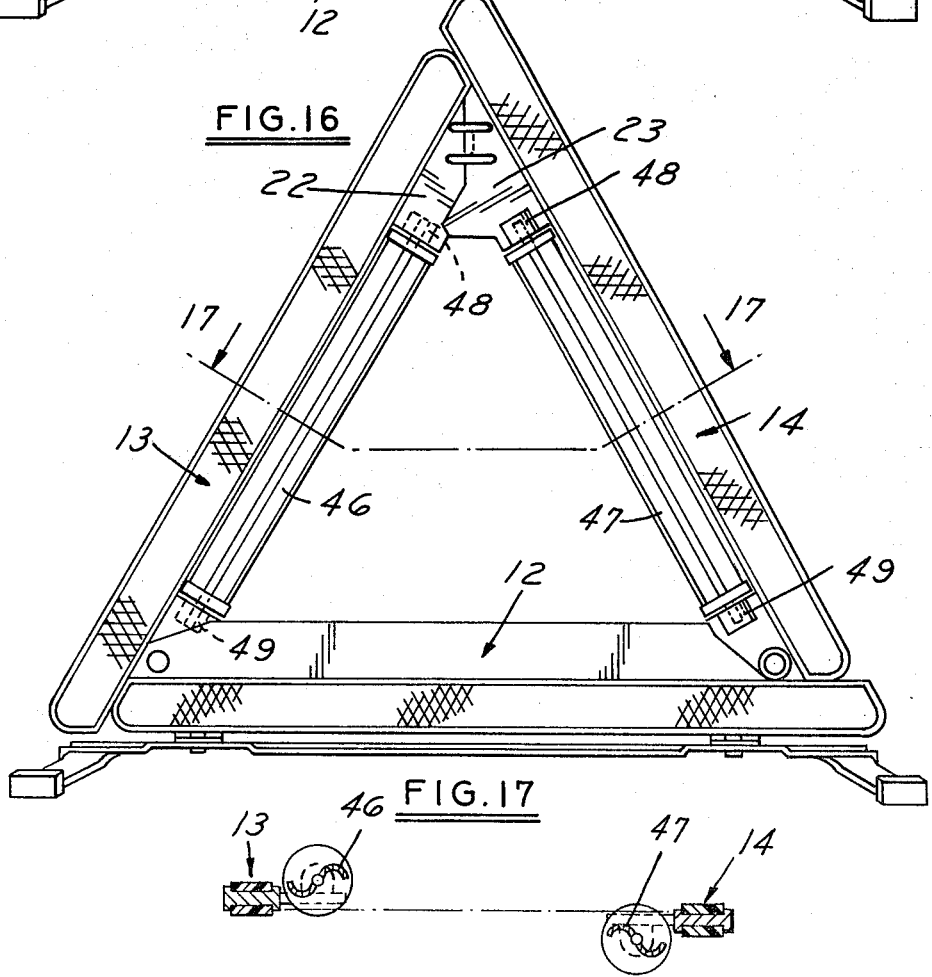

EMERGENCY TRIANGULAR ROAD SAFETY DEVICE

This invention relates to emergency warning devices or flares.

BACKGROUND OF THE INVENTION

In recent times, emergency warning devices or flares have been designed to be carried im motor vehicles and used on the roadway to warn approaching traffic of the presence of a stopped vehicle. Such devices are intended to reduce deaths and injuries due to rear end collisions between moving traffic and disabled vehicles. Governmental regulations have been established to standardize the requirements for such devices in terms of size, configuration, color, reflectivity, luminance, stability and durability. Typical standards are the Motor Vehicle Safety Standard No. 125 in the United States and Canadian Standards Association standard D171 in Canada. These standards provide that the emergency warning device be triangular in shape and have red reflective material and orange fluorescent material on the opposed faces of the triangle. The standards further call for the warning device as having stability such that when the warning device is erected on a horizontal brush concrete surface, both with and against the brush marks and subjected to a horizontal wind of 40 m.p.h. in any direction for three minutes (a) no part of it shall slide more than three inches from its initial position; (b) its triangular portion shall not tilt to a position that is more than ten degrees from the vertical; and (c) its triangular position shall not turn through a horizontal angle of more than ten degrees in either direction from the initial position.

It has been shown in studies made by the present inventors and confirmed by The National Aeronautical Establishment, Ottawa, Canada, that the present standards on stability are inadequate to withstand the normal winds or the effect of a passing vehicle on the warning devices. Accordingly the National Aeronautical Establishment has recently recommended that the weight of the device thus be substantially increased.

The problem with such a solution is that it would require an increase in the weight of present emergency road warning flares to about 250% or more of the present weight. Such a requirement would thus increase the weight that must be carried by the vehicle since each vehicle is presently required to carry three warning devices making it difficult and awkward to handle them, to attach them to the vehicle for storage and increasing fuel consumption of the vehicle.

The present invention is to provide an improved emergency warning device which does not materially increase the weight to be carried by the vehicle; which effectively will withstand crosswinds and winds due to passing vehicles substantially above the present standards; and which preferably can be folded and stored in a volumetric area as emergency warning devices presently are stored.

In accordance with the invention, vane means are provided on the emergency warning device and is shaped and positioned such that air flow against a face of the triangle produces a downward force tending to prevent movement of the device relative to a road surface.

DESCRIPTION OF THE DRAWINGS

FIG. 7 is an elevational view of a modified form of emergency warning device.

FIG. 8 is a sectional view taken along the line 8—8 in FIG. 7.

FIG. 13 is an elevational view of another modified form of emergency warning device.

FIG. 14 is a fragmentary sectional view taken along the line 14—14 in FIG. 13.

FIG. 15 is a fragmentary sectional view similar to FIG. 14 of a further modified form of emergency warning device.

FIG. 16 is an elevational view of another modified form of emergency warning device.

FIG. 17 is a sectional view taken along the line 17—17 in FIG. 16.

DESCRIPTION

Figure 1:
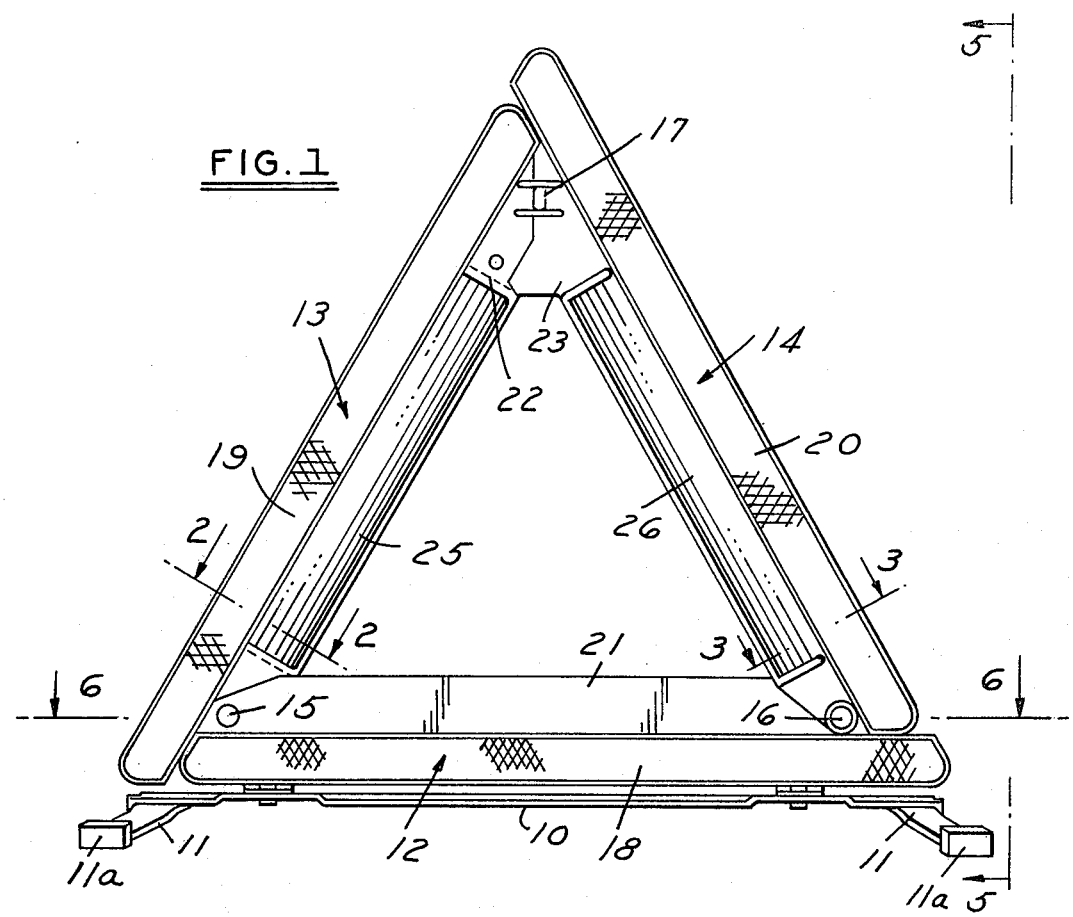
FIG. 1 is an elevational view of an emergency warning device embodying the invention.
Figure 4:
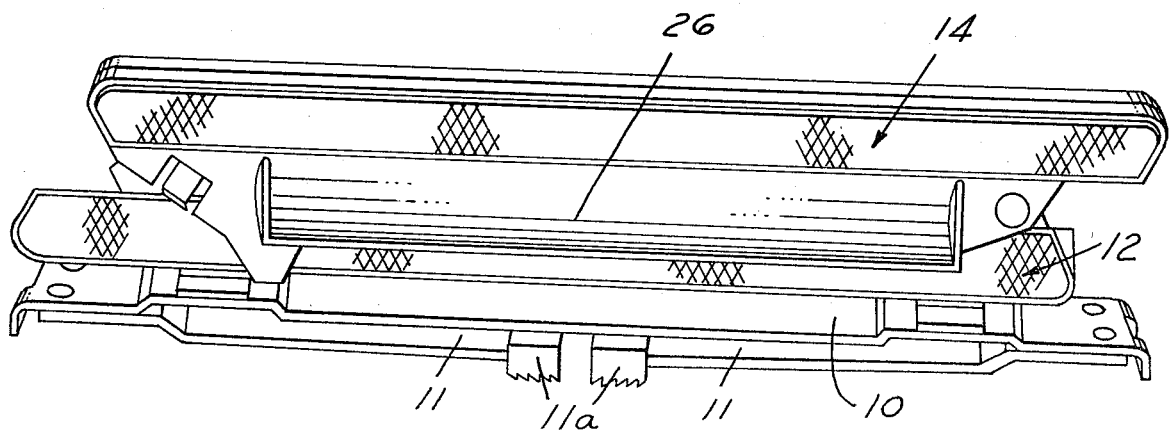
FIG. 4 is a perspective view of the emergency warning device in folded condition.
Figure 5:
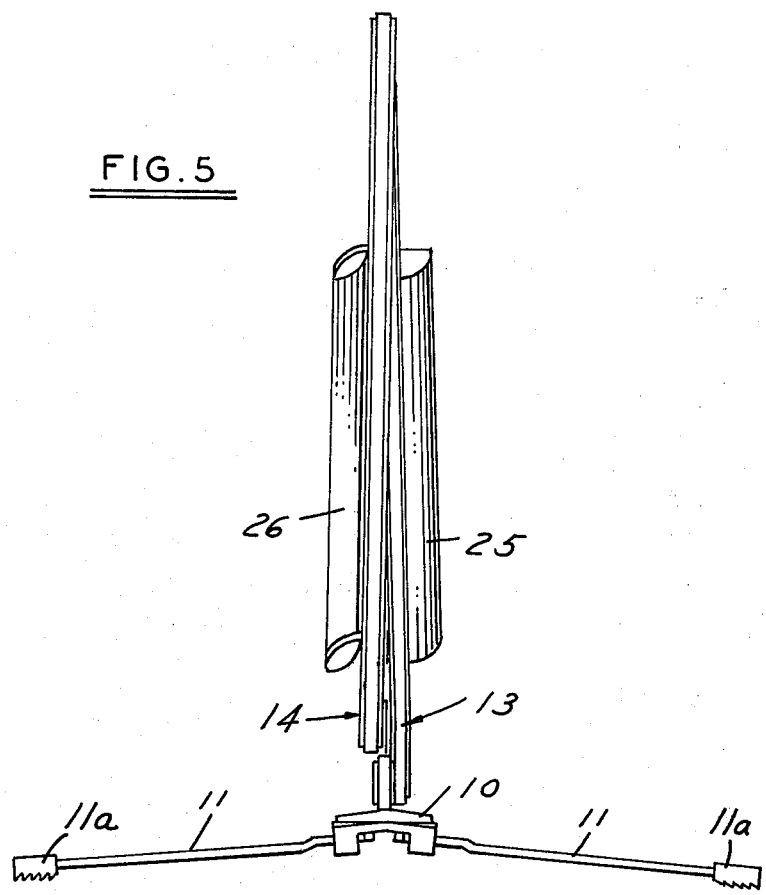
FIG. 5 is a side elevational view of the emergency warning device.
Figure 6:
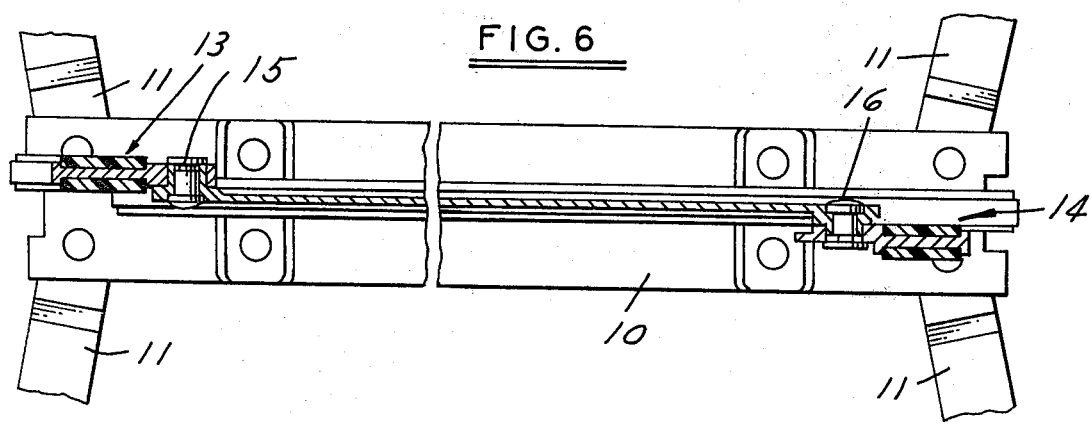
FIG. 6 is a fragmentary sectional view on an enlarged scale taken along the line 6—6 in FIG. 1.

Referring to FIG. 1, the emergency warning device is of the generally well known type comprising a base 10 having foldable legs 11 and ground engaging elastomeric pads 11a. The base 10 supports three arms 12, 13 and 14 that are pivoted to one another and foldable to define an equilateral triangle. Arm 12 is mounted on the base 10 and arms 13, 14 are pivoted to the ends of the arm 12 by rivets 15, 16 (FIG. 6) so that they can be extended from a folded condition as shown in FIG. 4 to an unfolded condition as shown in FIG. 1 wherein the upper ends of the arms 13, 14 are connected to one another by a disconnectable connector 17.

Conventionally, arms 12, 13 and 14 include passive signal means in the form of reflective portions 18, 19, 20 formed by retroreflective elements such as cube corner reflectors and fluorescent portions 21, 22, 23 that are formed by fluorescent material. The retroreflective portions 18, 19, 20 and fluorescent portions are required by regulations that have been established for such emergency warning devices.

Figure 2:
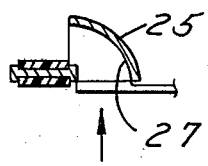
FIG. 2 is a sectional view taken along the line 2—2 in FIG. 1.
Figure 3:
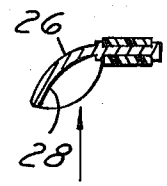
FIG. 3 is a sectional view taken along the line 3—3 in FIG. 1.

In accordance with the invention as shown in FIGS. 1–5, parts of the fluorescent portions 22, 23 of the arms 13, 14 are curved in the form of vanes 25, 26 extending along the length of the arms 13, 14 and shaped to cause the air flowing against the face of the triangle to flow upwardly and produce a downward force tending to prevent movement of the device relative to a road surface. As shown in FIGS. 2 and 3, each vane 25, 26 is preferably curved uniformly for approximately 90° to define concave surfaces 27, 28 facing the oncoming air so that the air is deflected from the direction of the arrow and changed 90° in its direction. Since the vanes 25, 26 are inclined with respect to a vertical and horizontal, this deflection of the air produces a positive downward force increasing the force or drag between the base and the road surface with which the emergency warning device is pressed into engagement with a road surface thereby tending to prevent movement of the device relative to the road surface.

In order to facilitate folding of the emergency warning device, vane 25 is curved rearwardly out of the general vertical plane of the device (FIG. 2) and vane 26 is curved forwardly out of the plane of the device (FIG. 3).

In the form of the invention shown in FIGS. 7 and 8, parts of the fluorescent portions 22, 23 of the arms 13, 14 are shaped in the form of double vanes 29, 30, shown in FIG. 8, which are generally T-shaped in cross section and define opposed curved concave surfaces 31, 32 and 33, 34. The pairs of opposed curves concave surfaces 31, 33 or 32, 34 function in the same manner as concave surfaces 27, 28 of the vanes 25, 26 in FIGS. 1–6 to produce a positive downward force on the device. However, this device is bidirectional, that is, in order to achieve the effect of providing a downward force due to air flow, the emergency warning device can be positioned into the wind from either side as contrasted to that shown in FIGS. 1–6 which must be positioned so that the air engages the concave surfaces 27, 28 of the vane portions 25, 26.

Figure 9:
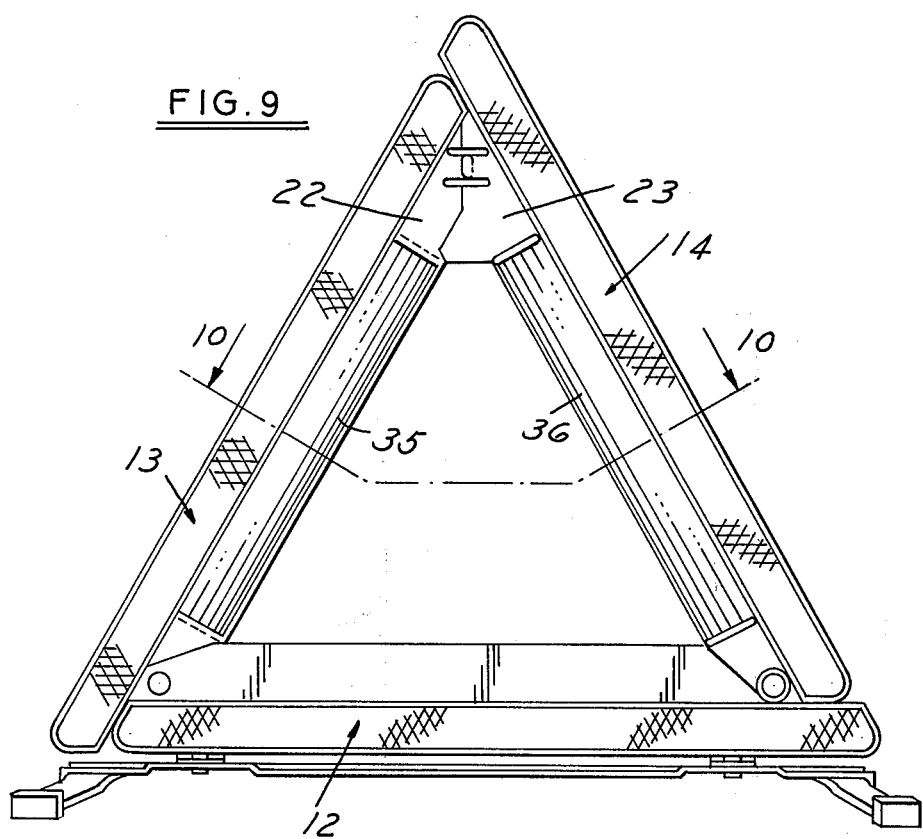
FIG. 9 is an elevational view of a further modified form of emergency warning device.
Figure 10:
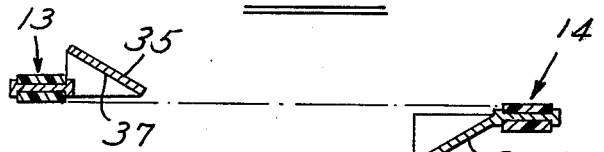
FIG. 10 is a sectional view taken along the line 10—10 in FIG. 9.

In the form of the invention shown in FIGS. 9 and 10, parts of the fluorescent portions 22, 23 of the arms 13, 14 are shaped in the form of flat vanes 35, 36 rather than curved vanes. Each vane 35, 36 forms an acute angle of approximately 30° with the plane or face of the triangle as shown in FIG. 10. This form also functions in the same manner so that surfaces 37, 38 deflect the air laterally and produce a downward force but is less effective than the curved concave surfaces of the forms shown in FIGS. 1–8. To facilitate folding, flat vane 35 extends rearwardly out of the general vertical plane of the device and flat vane 36 extends forwardly out of the general vertical plane of the device (FIG. 10).

Figure 11:
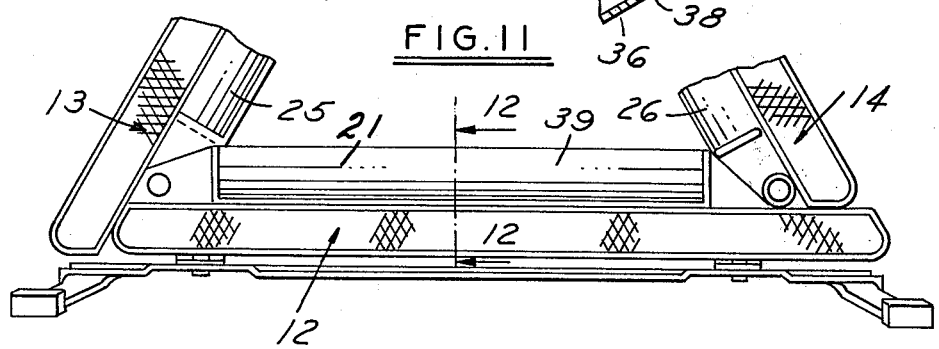
FIG. 11 is a fragmentary elevational view of another modified form of emergency warning device.
Figure 12:
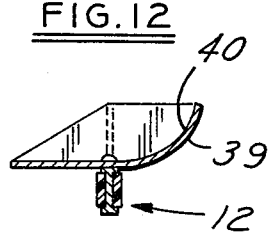
FIG. 12 is a fragmentary sectional view taken along the line 12—12 in FIG. 11.

The form of the invention shown in FIGS. 11 and 12 is similar to the form shown in FIGS. 1–6 except that a part of the fluorescent portion 21 of the lower arm 12 is also formed into a curved vane 39 defining a concave surface 40 that deflects the air upwardly producing a downward force tending to prevent movement of the device along a road surface.

In the form of the invention shown in FIGS. 13 and 14, a vane 41 is positioned so that it extends horizontally between the conventional upwardly extending arms 13, 14 and is flat but inclined upwardly and rearwardly with respect to the oncoming air to define a surface 42 that deflects the air to produce a downward force tending to prevent movement of the device along a highway. The vane 41 is fastened to the arms 13 and 14 by brackets 43. This form has the advantage in that a conventional triangular emergency warning device can be readily converted to provide the added resistance to movement along a road surface.

In the form of the invention shown in FIG. 15, the straight vane 41 of FIGS. 13, 14 is replaced with a curved vane 44 that causes the air to strike a concave surface 45 producing the downward force.

In the form of the invention shown in FIGS. 16 and 17, a part of each fluorescent portions 22, 23 is removed and a Savonius rotor 46, 47 is provided in its place. The rotors are mounted in bearings 48, 49 for rotation about axes generally parallel to the arms 13, 14. Rotation of the Savonius rotors, which are generally S-shaped in cross section, causes the rotors to spin and create a Magnus effect which is based upon the principle that a rotating cylinder or surface when placed in an air flow will develop a force normal to the plane of the rotor and the air stream direction.

Figure 18:
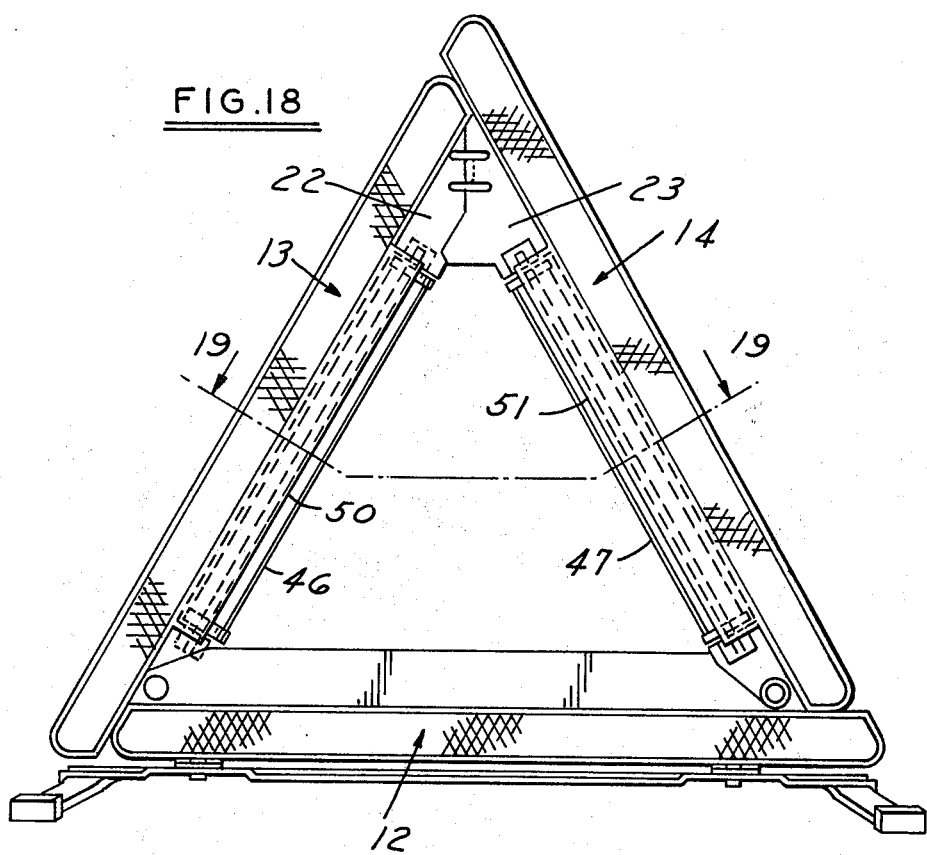
FIG. 18 is an elevational view of another modified form of emergency warning device.
Figure 19:
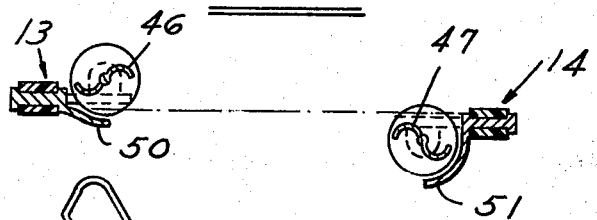
FIG. 19 is a sectional view taken along the line 19—19 in FIG. 18.

In the form of the invention shown in FIGS. 18 and 19, deflectors 50, 51 are associated with the Savonius rotors 46, 47 and function to direct the air only toward the portion of the rotor that cause rotation, that is, the deflectors 50, 51 prevent the oncoming air from contacting the portion of the rotor that would prevent rotation and thereby increase the efficiency of the rotor.

Figure 20:
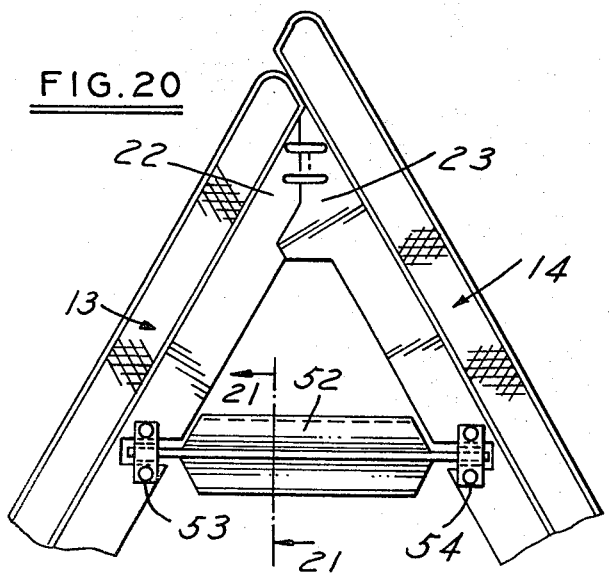
FIG. 20 is a fragmentary elevational view of a further modified form of emergency warning device.
Figure 21:
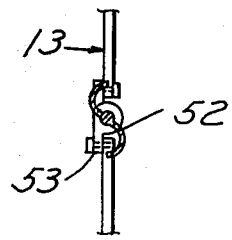
FIG. 21 is a fragmentary sectional view taken along the line 21—21 in FIG. 20.

In the form of the invention shown in FIGS. 20 and 21, the Savonius rotor 52 is mounted between the arms 13 and 14 and extends horizontally, being supported by bearings 53, 54 and produces a downward force upon rotation to minimize the tendency of the device to be moved along a road surface.

In each of the forms of the invention the device allows the wind to produce a downward force. This is achieved by reshaping parts of the fluorescent portions 21, 22, 23 or adding one or more parts without diminishing the effective cross sectional area of fluorescent material as required by the standards that must be met.

Emergency warning devices made in accordance with the inventions have been tested in wind tunnels and on highways and found to provide improved resistance to normal winds and effects of passing vehicles.

A series of tests were performed in an 8 ft.×6 ft. wind tunnel in order to determine the steady wind speed to first cause an emergency warning device to slide on a horizontal flat surface. Each of the warning devices tested was placed on a common test surface which was fastened to the floor of the wind tunnel working section. The warning devices were tethered by a light cord to a hook placed upstream of the flare to prevent damage when the devices moved. The wind tunnel airspeed was then slowly increased until the advance warning flare began to slide. The airspeed to cause incipient sliding ($V_{SI}$) was then recorded.

The coefficient of static friction between the test surface and the elastomeric pads of the advance warning flare was measured to be 0.73. The results of these tests are summarized in Table I. Standard warning devices and devices A, B and C made in accordance with FIGS. 1–6 were tested.

TABLE I

| Device Tested | Weight in Pounds | $V_{SI}$ mph | % $V_{SI}$ Difference Greater than Standard |
|---|---|---|---|
| Standard | 4.2 | 37.4 | — |
| A | 4.2 | 43.1 | +15% |
| B (weight added) | 5.3 | 45.9 | +23% |

TABLE I-continued

| Device Tested | Weight in Pounds | $V_{SI}$ mph | % $V_{SI}$ Difference Greater than Standard |
|---|---|---|---|
| C (weight added) | 7.3 | 54.6 | +46% |

%$V_{SI}$ difference results are obtained by the expression $$\frac{V_{SIV} - V_{SIS}}{V_{SIS}} \times 100$$

where $V_{SIS}$ is $V_{SI}$ for a standard warning device and $V_{SIV}$ is $V_{SI}$ for a warning device embodying the invention.

It can be seen that the emergency warning devices made in accordance with the invention provide improved results over a standard emergency warning device. If desired, the addition of weight on the base of emergency warning devices made in accordance with the invention combines with the negative lift of the devices to provide even greater resistance to movement.

Highway tests on the emergency warning devices were made at a location situated on the shoulder, on the northside of a westbound land. The highway at this location had a ten foot gravel covered shoulder. The weather conditions were overcast and cloudy with winds from the south at 0–8 m.p.h., measured by a cup anemometer positioned 100 ft. from the shoulder of the highway.

Three test surfaces, half-inch thick with dimensions 32 inch by 48 inch were fastened to the shoulder of the highway 60 feet apart. The centre of the warning devices was set 3 feet from the white, highway marker line. The test surfaces were checked to ensure that the surfaces were horizontal. The position of the forward position of each warning device, when placed upon the test surface, was marked by spraying black paint on the test surface. When the warning device moved due to the induced airflow caused by passing trucks, then it was possible to measure and record the movement. During the testing standard warning devices and a warning device made in accordance with FIGS. 1–6 were placed on the prepared surfaces at the shoulder of the highway. Because at this time of day many trucks were passing, after a ten minute test period, the movement of the devices from the initial position was recorded.

On completion of the highway testing the test surfaces were tested in the laboratory to determine the coefficient of static friction between the surface and the elastomeric pads of the warning devices highway tested. The average measured values of static coefficient of friction, was found to be 0.75.

The results of the highway tests are summarized in Table II.

TABLE II

| Displacement | Standard Device | Improved Device | $\left(\frac{\text{Improved}}{\text{Standard}} \times 100\right)$ % Relative Displacement |
|---|---|---|---|
| Movement | 3.6 feet | 1.3 feet | 36% |
| Rotation | 13.6 degrees | 7.2 degrees | 53% |

It can thus be seen that the emergency warning devices embodying the invention provide improved stability along the highway as contrasted to a standard emergency warning device.

A comparative result, of both the wind tunnel and highway tests, show that the emergency warning device embodying the invention can provide improved resistance to wind speeds at a substantially lesser weight than for standard devices as summarized in Table III.

TABLE III

| $V_{SI}$ (mph) | $W_{ST}$ (pounds) | $W_V$ (pounds) | % Weight Saving |
|---|---|---|---|
| 40 | 4.8 | 3.8 | 26% |
| 50 | 7.3 | 5.8 | 26% |
| 60 | 10.5 | 8.4 | 25% |

Where $W_{ST}$ is the weight of the standard warning device and $W_V$ is the weight of the warning device embodying the invention and where the weight saving is defined by the expression $$\frac{W_{ST} - W_V}{W_V} \times 100$$

Wind tunnel and highway tests of the emergency warning device shown in FIGS. 11 and 12, made under similar conditions as the other tests, show improved resistance and stability to winds and passing vehicles. The wind tunnel tests are summarized in Table IV.

TABLE IV

| Type | Weight (pounds) | $V_{SI}$ | % $V_{SI}$ Difference Greater than Standard |
|---|---|---|---|
| Standard | 4.1 | 39 mph | — |
| Improved (FIG. 11, 12) | 4.6 (4.1) | 52 mph (49 mph) | 33% (26%) |
| Standard | 5.6 | 45 mph | — |
| Improved (FIG. 11, 12) | 5.6 | 60 mph | 33% |

Wherein the results in parentheses are normalized to the same weight as the standard warning device.

The highway tests of standard warning devices and warning devices are made in accordance with FIGS. 11 and 12 are summarized in Table V.

TABLE V

| Displacement | Standard | Improved (FIGS. 11, 12) | % Relative Displacement $\frac{\text{Improved}}{\text{Standard}} \times 100$ |
|---|---|---|---|
| Movement | 3.7 feet | 0.14 feet (0.15 feet) | 3.8% (4.1%) |
| Rotation | 19 degrees | 7 degrees (7 degrees) | 37% (37%) |

Wherein the results in parentheses are normalized to the same weight of the standard warning device.

Further tests show that the other forms of emergency warning devices provide improved results over a standard warning device. Table VI shows that increase in negative lift or downward force.

TABLE VI

| | Increment of downward force over standard | Increment ($C_L/C_D \times 100$) Above Standard |
|---|---|---|
| Standard | — | — |
| Improved (FIGS. 13, 14) | +0.43 pounds | +16% |

TABLE VI-continued

| | Increment of downward force over standard | Increment ($C_L/C_D \times 100$) Above Standard |
|---|---|---|
| Improved (FIG. 15) | +0.45 pounds | +16% |
| Improved (FIGS. 9, 10) | +0.41 pounds | +18% |
| Improved (FIGS. 1-6) | +0.46 pounds | +17% |

Where
$C_L$ = negative lift coefficient
$C_D$ = drag coefficient

We claim:

1. An emergency warning device comprising
a base adapted to rest on a road surface,
three arms extending upwardly from the base to define a triangle, the plane of the triangle defining a face generally perpendicular to the road surface and adapted to face the oncoming traffic when the device is on a road surface,
one of said arms extending horizontally on said base and said other two arms extending upwardly,
each arm having passive signal means on at least one surface thereof,
and vane means constructed and arranged, shaped and positioned on said triangle such that wind air flow against the vane means flows upwardly and produces a downward force on the vane means increasing the drag between the base and the road surface tending to prevent movement of the device relative to a road surface.

2. The emergency warning device set forth in claim 1 wherein said vane means comprises:
a vane extending out of the plane of the triangle.

3. The emergency warning device set forth in claim 2 wherein said vane forms a part of one of said arms.

4. The emergency warning device set forth in claim 2 wherein said vane is curved in cross section.

5. The emergency warning device set forth in claim 2 wherein said vane comprises a portion of each of said upwardly extending arms formed out of the plane of said arms.

6. The emergency warning device set forth in claim 1 wherein said vane means are curved to form a concave air contacting surface.

7. The emergency warning device set forth in claim 6 wherein said vanes form a part of the upwardly extending arms.

8. The emergency warning device set forth in claim 7 wherein said vanes include concave surfaces which face each side of the device so that the device can be utilized in either direction on the highway.

9. The emergency warning device set forth in claim 1 wherein vane means are provided along each arm.

10. The emergency warning device set forth in claim 1 wherein said vane means comprises a vane extending generally horizontally between the upwardly extending arms.

11. The emergency warning device set forth in claim 10 wherein said vane means comprises a vane extending out of the plane of said triangle.

12. The emergency warning device set forth in claim 10 wherein said vane means is arcuate in cross section defining a concave surface in the direction of the air flow toward the device.

13. The emergency warning device set forth in claim 1 wherein said vane means comprises a Magnus effect rotor mounted on said device.

14. The emergency warning device set forth in claim 13 wherein said Magnus effect rotor extends between the upwardly extending arms.

15. The emergency warning device set forth in claim 1 wherein said vane means comprises a Magnus effect rotor along each of said upwardly extending arms.

16. The emergency warning device set forth in claim 15 including a rotor deflector associated with said rotors.

17. An emergency warning device comprising
a base adapted to rest on a road surface,
three arms extending upwardly from the base to define an equilateral triangle, the plane of the triangle defining a face generally perpendicular to the road surface and adapted to face the oncoming traffic when the device is on a road surface,
one of said arms extending horizontally on said base and said other two arms extending upwardly,
each arm having reflective and fluorescent means on opposed surfaces thereof,
and vane means constructed and arranged, shaped and positioned on said equilateral triangle such that wind air flow against the vane means flows upwardly and produces a downward force on the vane means increasing the drag between the base and the road surface tending to prevent movement of the device relative to a road surface.

18. The emergency warning device set forth in claim 17 wherein said vane means comprises
a vane extending out of the plane of the triangle in the area of said fluorescent means.

19. The emergency warning device set forth in claim 18 wherein said vane is curved in cross section to form a concave air contacting surface.

20. The emergency warning device set forth in any of claims 17-19 wherein said vane comprises a portion of the fluorescent means of each of said upwardly extending arms forced out of the plane of said arms.

21. The emergency warning device set forth in claim 17 wherein said vanes include concave surfaces which face each side of the device so that the device can be utilized in either direction on the highway.

22. The emergency warning device set forth in claim 17 wherein said vane means comprises a vane extending generally horizontally between the upwardly extending arms intermediate the ends of said arms.

23. The emergency warning device set forth in claim 22 wherein said vane means comprises a vane extending out of the plane of said triangle.

24. The emergency warning device set forth in claim 22 wherein said vane means is arcuate in cross section defining a concave surface in the direction of the air flow toward the device.

25. The emergency warning device set forth in claim 17 wherein said vane means comprises a Magnus effect rotor mounted on said device in the area of said fluorescent means.

26. The emergency warning device set forth in claim 25 wherein said Magnus effect rotor extends between the upwardly extending arms.

27. The emergency warning device set forth in claim 26 including a rotor deflector associated with said rotors.

* * * * *